Nov. 14, 1961 V. PELAGATTI 3,009,027
ADVANCE CONTROL
Filed Nov. 18, 1959
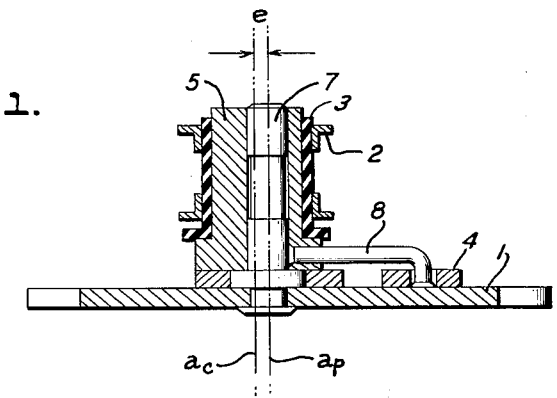
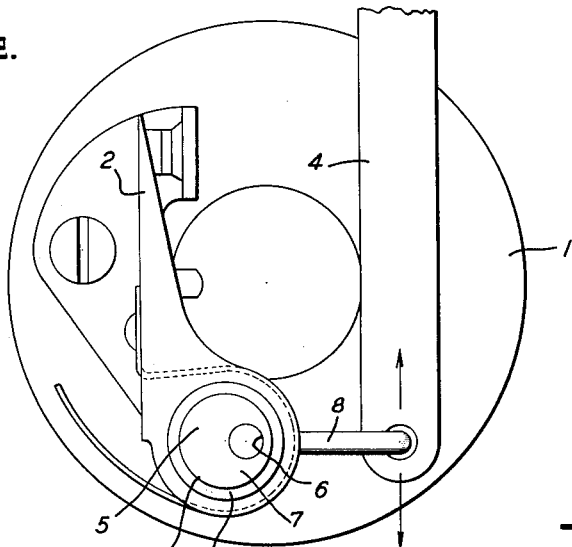
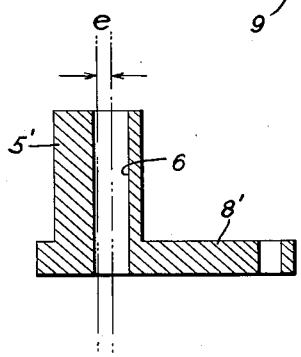
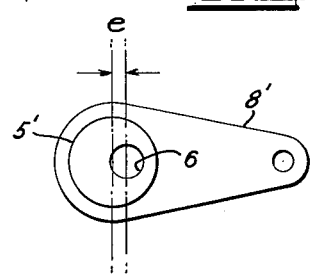
INVENTOR
VINCENZO PELAGATTI
BY Harold T. Stowell
Harold L. Stowell
ATTORNEYS

United States Patent Office 3,009,027
Patented Nov. 14, 1961

3,009,027
ADVANCE CONTROL
Vincenzo Pelagatti, Milan, Italy, assignor to Fabbrica Italiana Magneti Marelli S.p.A., Milan, Italy, a firm
Filed Nov. 18, 1959, Ser. No. 853,980
3 Claims. (Cl. 200—31)

The present invention refers to control devices of the advance angle in ignition apparatus, particularly depression controls for motor vehicles, wherein alteration of the advance angle is obtained by movement of the breaker arm.

In the already known devices of this kind the breaker arm is rotatably fitted to a supporting journal secured to a tongue that in its turn carries out a rotation movement about a stationary pivot, that is eccentric as to the cam axis, the tongue rotation being controlled by a driving rod or lever.

The drawbacks of said devices are well known and consist substantially in the reversibility of the operation mechanism, supporting system of the breaker arm and friction of the device parts.

A good operation of the advance control is prevented by said reversibility, as the tangential cam pulses on the breaker arm sliding block are transmitted to the driving rod.

A rigid support is not provided for the breaker arm but it is journalled on a movable part. This and also the friction resulting from the tongue sliding motion are further drawbacks of said advance control. Moreover, the operation force required by the depression control owing to said friction stress is very high and causes a reduction of the sensitivity of the whole device.

The present invention aims at a removal of said drawbacks by providing a device of direct and certain operation and embodying moreover features of a very simple embodiment, stoutness and stability.

The novel advance control is characterized in that driving thereof is obtained by means of an eccentric in such a way that the axis, about which the breaker arm performs a swinging motion at any contact opening or closing, can rotate about a second axis that is provided inside of the breaker arm guide bore or bush.

In the eccentric driving device of the invention the second axis is about a pivot that is secured to the plate and is spaced from breaker arm rotation axis owing to its eccentric position.

Further features and details will appear from the accompanying drawing, wherein:

FIG. 1 is a longitudinal section of the device on a plane through the eccentric and driving projection.

FIG. 2 is a plan view of said device and

FIGURES 3 and 4 show another embodiment of the driving member through a lever eccentric.

Referring to the figures, 1 indicates the stationary breaker arm carrying plate, 2 is the breaker arm with associated guide bush 3 and 4 is the device control rod or lever, that is connected to a resilient membrane in the case of a depression control.

According to the invention the connection between said control rod and breaker arm is obtained by fitting of this latter through an isolating bush 3 to a small cylinder 5, which is mounted by means of an eccentric bore 6 on a bearing journal 7 secured to the plate 1, said small cylinder carrying a radial projection 8 connected to the control lever 4.

When in the operation of the device the control lever 4 performs a motion as for instance it is dragged along by the membrane of the depression controls, it acts upon the projection 8 causing a rotational movement of the eccentric on the stationary journal 7 and therefore a breaker arm movement with consequent alteration of the advance angle. The rotation axis $a_c$ of the breaker arm performs then a rotation movement about the axis $a_p$ of said stationary journal provided inside of breaker arm bore 9 or guide bush 3 forced thereinto.

By providing a suitable eccentricity $c$, that is the distance between axis $a_c$ and axis $a_p$, with respect to the diameters of the breaker arm bore 9 and cylinder bore 6, it is possible to achieve on the ground of known features of the eccentric devices a complete irreversibility of the device in the sense that the cam impact against the breaker arm is not transmitted back to the control member.

In the modified form of the invention shown in FIGS. 3 and 4 the radially projecting member 8', corresponding to projection 8 of FIG. 1, is formed integrally with the cylinder 5'.

Even though for constructional reasons it should not be suitable to achieve a complete irreversibility of the device, it is always possible to provide the device with such a reversibility that a reduced cam impact is transmitted to the control member.

In the embodiment according to the invention the small cylinder 5 with eccentric bore 6 can be easily machined with the axis $a_p$ of said bore exactly parallel to the cylinder axis $a_c$ and the rotation axis of the breaker arm carries out therefore such a motion as to be always parallel to itself thereby ensuring a more correct operation of the device.

This latter condition is more difficult to be carried out in practice, when the breaker arm bearing journal is riveted on a tongue plate, which is in its turn supported or guided by other means.

A further advantage of the eccentric mechanism according to present invention consists in the possible self-cleaning of the breaker arm contacts during operation thereof.

I claim:
1. Advance control device for motor ignition apparatus comprising a breaker arm, bearing means mounting said breaker arm for rotation about a first axis for opening and closing movements thereof, said bearing means being mounted for rotation about a second axis parallel to and spaced from said first axis, and means for effecting rotation of said bearing means about said second axis in response to changes in the motor intake pressure.
2. Advance control device as claimed in claim 1 wherein said bearing means is a cylindrical member mounted for rotation about an eccentric longitudinal axis.
3. Advance control device as claimed in claim 2 including a lever member attached to said cylindrical bearing member for rotating the bearing member about said eccentric longitudinal axis in response to changes in the motor intake pressure.

References Cited in the file of this patent
UNITED STATES PATENTS

| | | |
|---|---|---|
| 2,765,377 | Buchmann | Oct. 2, 1956 |
| 2,797,269 | Buck et al. | June 25, 1957 |
| 2,854,534 | Beauclair | Sept. 30, 1958 |